United States Patent
Hiramoto

(10) Patent No.: US 6,698,859 B2
(45) Date of Patent: Mar. 2, 2004

(54) IMAGE DATA PROCESSING METHOD FOR INK JET PRINTER

(75) Inventor: Kenichiro Hiramoto, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/238,353

(22) Filed: Sep. 9, 2002

(65) Prior Publication Data

US 2003/0048315 A1 Mar. 13, 2003

(30) Foreign Application Priority Data

Sep. 13, 2001 (JP) .................................... 2001-277553

(51) Int. Cl.[7] .............................. B41J 2/205; B41J 2/21
(52) U.S. Cl. ........................................... 347/15; 347/43
(58) Field of Search ..................... 347/43, 15, 19; 358/1.9, 515, 525

(56) References Cited

U.S. PATENT DOCUMENTS 5,485,180 A * 1/1996 Askeland et al. ............. 347/15
5,706,414 A * 1/1998 Pritchard .................... 358/1.18

* cited by examiner

*Primary Examiner*—Thinh Nguyen
(74) *Attorney, Agent, or Firm*—Frishauf, Holtz, Goodman & Chick, P.C.

(57) ABSTRACT

An image data processing method for ink jet printer comprising the steps of obtaining an allowable amount of ink in accordance with inputted image data and characteristics of a medium for forming an image; selecting and ink jetting domain and fixing the amount of ink in the selected ink jetting domain at a specified value, on the basis of the allowable amount of ink; and practicing a quantization processing with the amount of ink in the ink jetting domain fixed at the specified value.

14 Claims, 6 Drawing Sheets

IMAGE DATA PROCESSING METHOD FOR INK JET PRINTER

BACKGROUND OF THE INVENTION

This invention relates to an image data processing method, and in particular, to an image data processing method suitable to an ink jet printer.

In recent years, an ink jet printer has been rapidly developing for its simple structure and capability of forming a high-quality image. Incidentally, in an ink jet printer, for the purpose of making its image quality higher, sometimes inks of plural densities having the same hue are used. FIG. 5 is a drawing showing a relationship between gradation and spatial ink density in the case where inks of two colors, a deep color and a pale color, are used.

As described in the above, by making a pale-colored ink included, it becomes possible to improve the image quality at lower-density side; however, according to the conventional technology shown in FIG. 5(a), spatial density of pale ink drops (proportion of the area occupied by ink drops to the ink landing domain) has already reached to 100% at the half point in the gray-level scale. In a general ink jet printer, a desired color is formed by making inks of 4 colors land on a medium; however, in such a situation that spatial density of ink drops reaches to 100% even when the half of the gray levels have been expressed by using an ink of one color, even though the absorption characteristic is improved, there is some concern that ink overflow is easy to occur.

For such a problem, as shown in FIG. 5(b), it is considered to reduce the spatial density of an ink by mixing it with a deep-colored ink before the spatial density of the pale-colored ink dots reaches to 100% (refer to the publications of the unexamined Japanese patent application H1-128836 and H9-156127). However, in order to achieve it, for example, it is necessary to apply an error diffusion processing to a deep-colored ink and a pale-colored ink independently, which poses a problem that the processing circuit becomes larger-scaled, or it becomes impossible to obtain the desired high image quality.

This invention has been made in view of the above-mentioned problems of conventional technologies, and it is its object to provide an image data processing method for an ink jet printer having a simple structure and being capable of suppressing ink overflow.

SUMMARY OF THE INVENTION

An image data processing method for ink jet printer of this invention comprises the steps of obtaining an allowable amount of ink in accordance with inputted image data and the characteristic of a medium for forming an image, selecting an ink jetting domain on the basis of said allowable amount of ink, while fixing the amount of ink in said selected ink jetting domain at a specified value, and practicing a quantization processing with the amount of ink in said ink jetting domain fixed at the specified value. Owing to this, in the case where there is some concern of ink overflow in the medium in accordance with the inputted image data and the characteristics of a medium for forming an image, in order to limit the amount of ink to be jetted to a value under an allowable amount of ink which is obtained from the above-mentioned image data and characteristic of the medium, an ink jetting domain where the amount of ink is determined to be a specified value (a low value or zero) is forcibly formed. On the other hand, the color error produced by forcibly forming a domain where the amount of ink is determined to be a specified value is canceled by adjusting the color in the neighboring domains by a quantization processing such as an error diffusion processing, by which a high-quality image can be formed with a simple structure, while ink overflow is suppressed.

The principle of this invention will be explained in detail by using a drawing. FIG. 1 is a drawing showing ink jetting domains on a medium schematically. In FIG. 1, positions indicated by a circle are ink landing (jetting) domains. In the drawing, the zone A1 enclosed by the dotted line is composed of 9 ink landing domains, and in the case where ink overflow in zone A1 is surmised from the inputted image data and the characteristics of the medium for forming an image, the amount of ink jetting for the central ink landing domain A2 is made to be a specified value, for example, zero. By doing this, even if landing of ink drops exceeding the absorption limit of the medium occurs in the neighborhood of the domain A2, the domain A2 absorbs the overflow; therefore, as the result, ink overflow can be suppressed. However, if the amount of ink of the domain A2 is made zero, the color of the domain A2 is recognized as the color of the medium (generally speaking, white), and if any control is not made, the image color of the zone A1 is reduced to a whitish color. Therefore, such a color error is canceled by making ink drops having a deeper color land on the ink landing domains around the zone A2. The degree of making the ink color deep can be obtained, for example, by an error diffusion processing, but it is not limited to this. Because the ink landing domains are extremely minute, when it is viewed from a distant position, the color of the zone A1 appears approximately the same as that of the original image; hence, the image quality can be preserved.

As described in the above, it is desirable to make the above-mentioned specified value zero, because it can suppress ink overflow effectively.

Further, it is desirable to make the above-mentioned quantization processing an error diffusion processing, because the correction of color error can be easily made.

Further, it is desirable to determine the aforesaid allowable amount of ink in accordance with the kind of the ink to be used for expressing the color corresponding to the inputted image data. The reason is that, for some color of ink, the degree of contribution to the color density are different from other colors.

Further, it is desirable that the aforesaid processing to fix the amount of ink at a specified value is determined in accordance with the kinds of the ink color to be used for expressing the color corresponding to the inputted image data. This can be coped with by changing the characteristic of the noise and/or the characteristic of the diffusion filter in the quantization processing in calculating the specified value.

Further, it is desirable to make the aforesaid kinds of ink color include at least cyan, magenta, and yellow because this can be applied to a usual ink jet printer.

Further, as regards the aforesaid at least one kind of ink color, comprises a pale color and a deep color of the same hue, this invention can be more effectively applied, because ink overflow tends to occur.

Further, it is desirable that the aforesaid characteristics of a medium include the ink absorption characteristic of said medium. The reason is that some medium is made of a material which is easy to produce ink overflow.

Further, it is desirable to change the characteristic of the noise in the quantization processing in calculating the specified value in accordance with the color corresponding to the inputted image data.

Furthermore, it is desirable to change the characteristic of the diffusion filter in the quantization processing in calculating the specified value in accordance with the color corresponding to the inputted image data.

DETAILED DESCRIPTION OF THE PREFERRED EMBODIMENT

Figure 2:
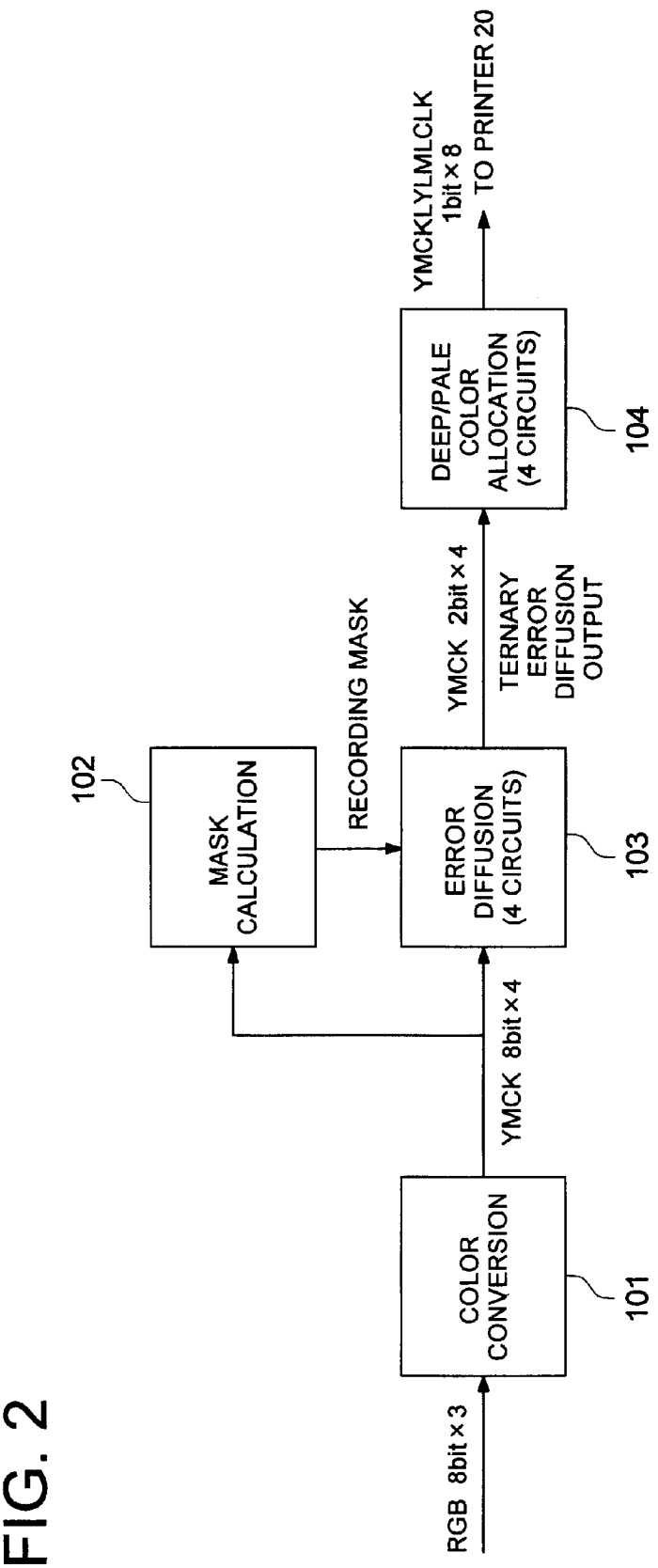
FIG. 2 is a drawing showing the outline structure of an image data processing circuit of this example of the embodiment.
Figure 3:
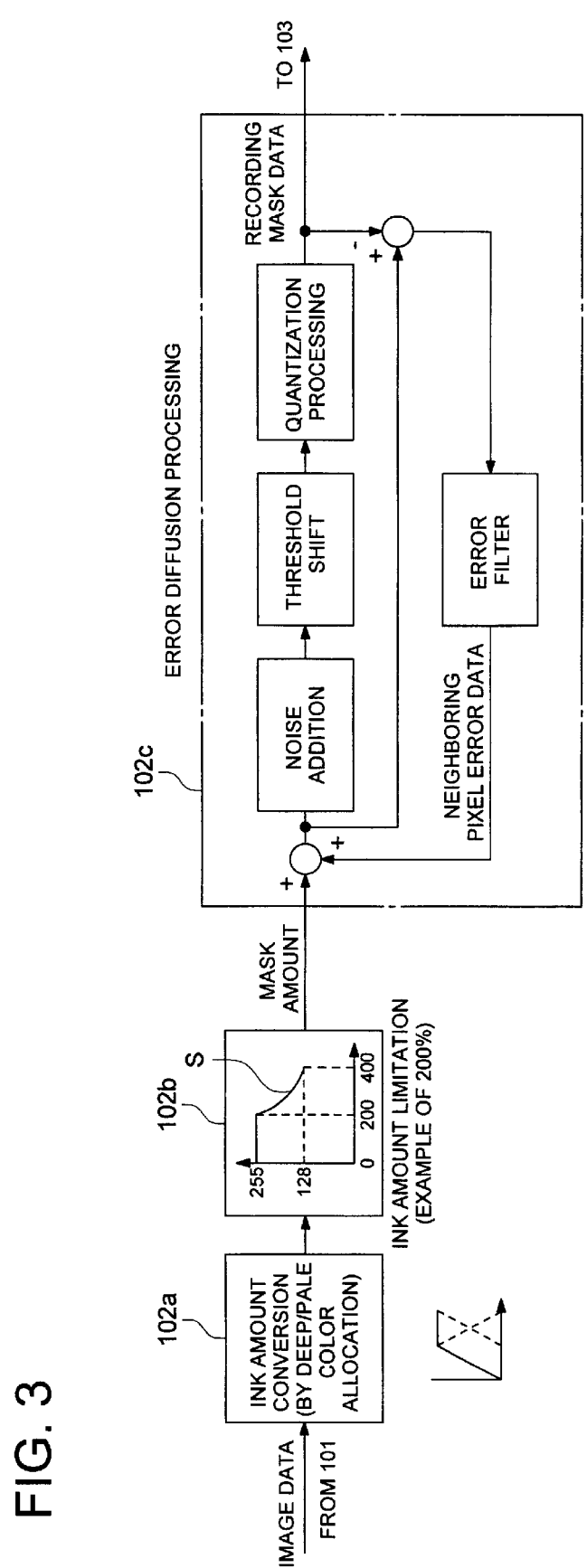
FIG. 3 is a circuit block diagram of a mask calculating process in the image data processing circuit of this example of the embodiment.
Figure 4:
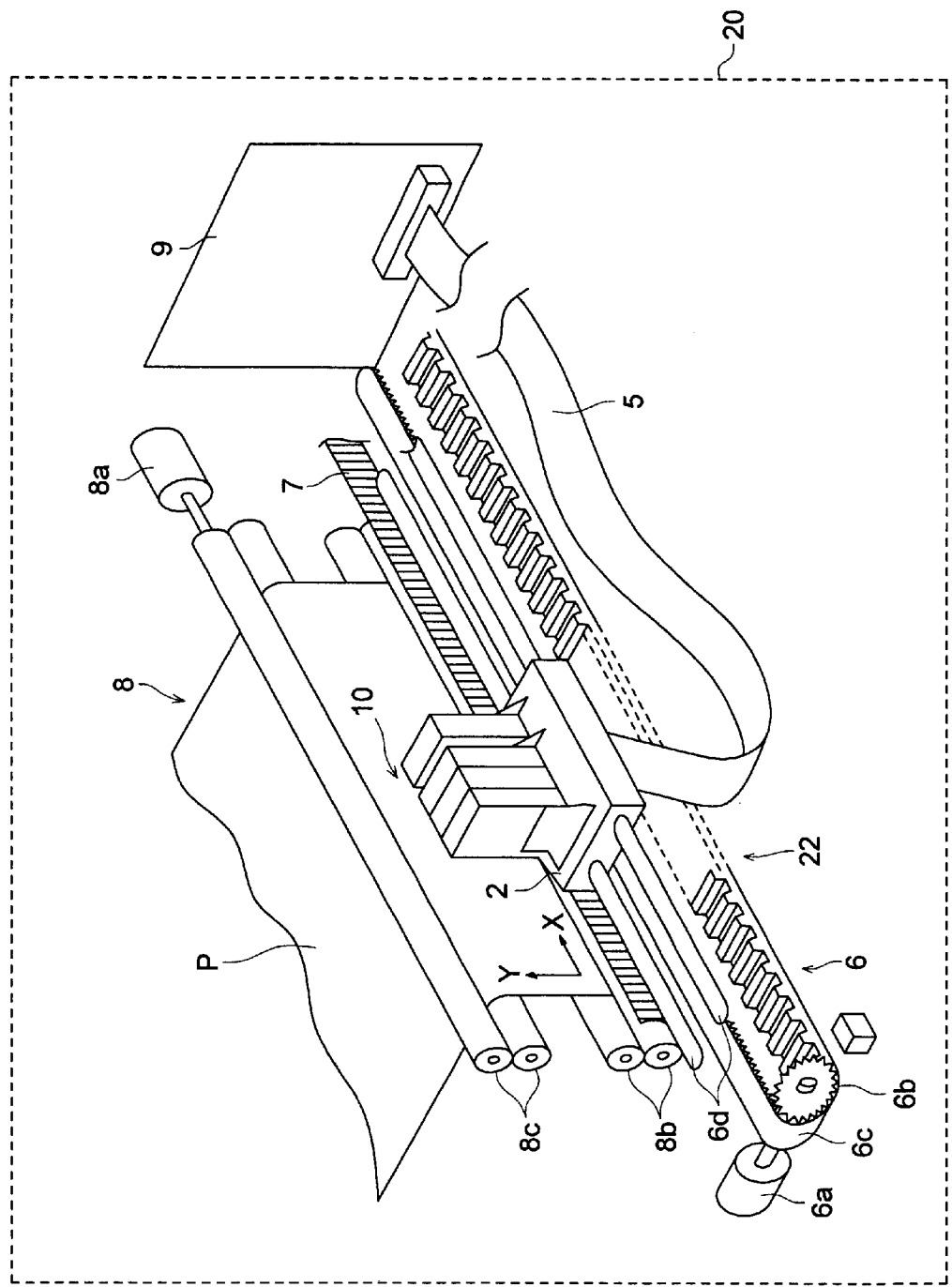
FIG. 4 is a drawing showing the structure of an ink jet printer.

In the following, the embodiment of this invention will be explained in detail with reference to the drawings. FIG. 2 and FIG. 3 are drawings showing the outline structure of an image data processing circuit of this invention. FIG. 4 is a drawing showing the structure of an ink jet printer.

First, an ink jet printer 20 shown in FIG. 4 will be explained. A carriage 2 is a case made of resin housing a head 10 and a head driver (not shown in the drawing). The head driver (not shown in the drawing) housed in the carriage 2 is composed of an IC for example, and is connected to a control board 9 through a flexible cable 5 which is drawn out of the carriage 2.

The carriage 2 is moved back and forth alternately in the main scanning direction (X direction) shown by the arrow mark in the drawing by a carriage driving mechanism 6. The carriage driving mechanism 6 has a structure including a motor 6a, a pulley 6b, a toothed belt 6c, and a guide rail 6d, and the carriage 2 is fixed to the toothed belt 6c.

When the pulley 6b is rotated by the motor 6a, the carriage 2, which is fixed to the toothed belt 6c, is moved along the X direction indicated by the arrow mark in the drawing. The guide rail 6d consists of two mutually parallel cylindrical-shaped bars and penetrates the through holes of the carriage 2, and the carriage 2 is made to glide on the guide rail.

Owing to this structure, the toothed belt 6c is not weighed down with the weight of the carriage 2 itself, and the direction of the alternate motion of the carriage 2 is made to come on a straight line. By reversing the rotating direction of the motor 6a, the direction of the moving of the carriage 2 can be changed, and by changing the number of revolutions, also it is possible to change the moving speed of the carriage 2. An ink cartridge (not shown in the drawing) has an ink tank inside. The ink supply inlet of the ink tank is opened when the ink cartridge is set to the carriage 2 and connected to an ink supply pipe, and is closed when the connection is released; thus, ink is supplied to the head 10.

In the carriage 2, there is provided the head 10. On the rear surface of this head 10, ink cartridges containing inks for jetting of deep and pale colors of Y, M, C, and K respectively are arranged in such a way as to be capable of mounting and dismounting. In addition, as regards the ink cartridges, it is omitted to show them in the drawing. The flexible cable 5 engages with a data transmitting means and has a structure such that a wiring pattern including a data signal line, power source line, etc. is printed on a flexible film; data are transmitted through it between the carriage 2 and the control board 9, and it complies with the movement of the carriage 2.

An encoder 7 is made up of a transparent resin film graduated in specified intervals, and by detecting these graduations by means of a photo-sensor provided at the carriage 2, the moving speed, position, and moving direction can be known. The paper transport mechanism 8 is a mechanism for transporting a recording paper sheet P in the sub-scanning direction Y indicated by the arrow mark in the drawing, and has a structure comprising a transport motor 8a, a pair of transport rollers 8b, and a pair of transport rollers 8c. The transport roller pair 8b and the transport roller pair 8c are roller pairs which are driven by the transport motor 8a and are rotated by a gear train (not shown in the drawing) respectively at peripheral speeds which are approximately equal to each other, with the speed of the transport roller pair 8c made very slightly faster.

The recording medium P, having been conveyed out of a paper feed mechanism (not shown in the drawing), is gripped between the pair of transport rollers 8b which are being rotated at a constant speed, and after its transporting direction is modified to the sub-scanning direction by a paper feed guide (not shown in the drawing), it is gripped by the transport roller pair 8c to be transported.

Because the peripheral speed of the transport roller pair 8c is faster than the transport roller pair 8b by an extremely small amount, the recording medium P passes the recording section without making a bend. Further, the speed of the recording medium P moving in the sub-scanning direction is set at a constant value.

In this way, after the recording medium P has been moved in the sub-scanning direction, the carriage 2 is moved at a constant speed in the main scanning direction, and an image is recorded in the specified range on one side of the recording medium P by putting ink drops jetted from the head 10 on it. An image is formed by repeating the above movement.

Figure 6:
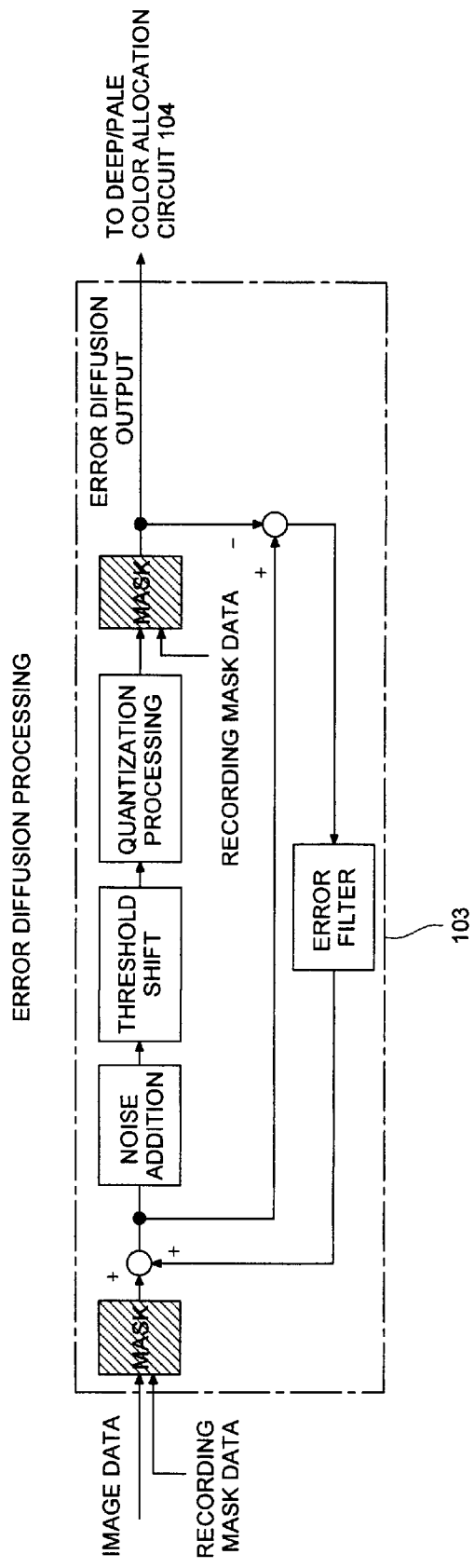
FIG. 6 is a circuit block diagram of an error diffusion circuit in the image data processing circuit of this example of the embodiment.

Next, the processing of image data to be provided to the printer 20 in the image data processing circuit will be explained. In FIG. 2, image data of 8 bits for each of R, G, and B obtained through photographing by means of a digital still camera, for example, are transformed into data of 8 bits for each of Y, M, C, and K by a color conversion circuit 101, and outputted. Such data of 8 bits for each of Y, M, C, and K are supplied into two parts, and one is inputted in a mask calculation circuit 102, while the other is inputted in an error diffusion circuit 103. In the error diffusion circuit 103, whose detailed circuit diagram is shown in FIG. 6, an error diffusion processing is practiced using a recording mask which has been formed in the mask calculation circuit 102, and the data are converted into data of 2 bits for each of Y, M, C, and K to be outputted. Because an error diffusion processing is a technology known to the public, its detail will not be explained. The outputted data of 2 bits for each of Y, M, C, and K are inputted in a deep/pale color allocation circuit 104, where the data are allocated for each of ink kinds, to be transmitted to the printer 20.

The role of the mask calculating circuit 102 is to obtain recording mask data (that is, the area ratio of ink nonlanding domains) by calculating the mask amount from the inputted image data of 8 bits for each of Y, M, C, and K. Hence, in carrying out the error diffusion in the error diffusion circuit 103, the corresponding values in the inputted image data of 8 bits for each of Y, M, C, and K are masked to be 0, and in that domain, the error diffusion output is also made 0. By doing this, ink amount can be arbitrarily controlled. In this case, even if the deep and pale color inks is subjected to a conventional producing method of ink dots as shown in Table 1, ink amount can be controlled.

TABLE 1

| Value of Y (or M, or C, or K) | 0 | 1 | 2 |
|---|---|---|---|
| Pale-colored dot (0: not record, 1: record) | 0 | 1 | 0 |
| Deep-colored dot (0: not record, 1: record) | 0 | 0 | 1 |

Figure 5:
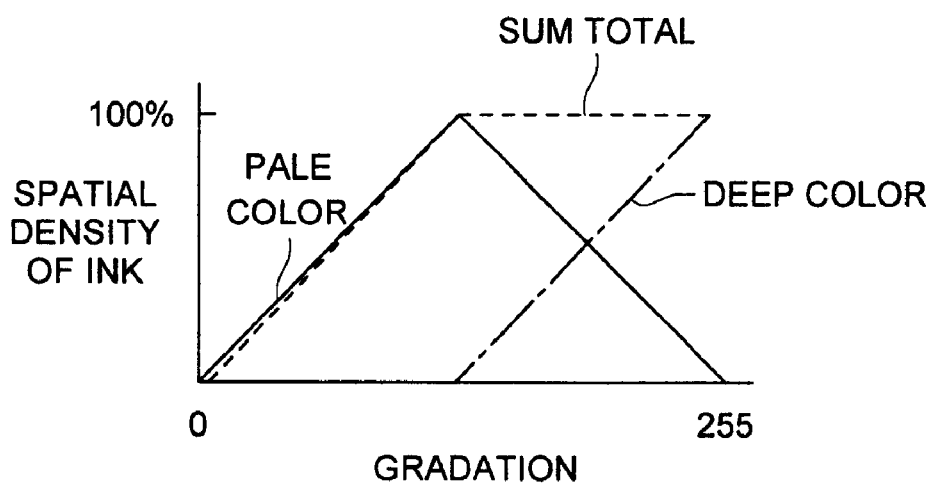
FIG. 5(a) and FIG. 5(b) are graphs showing the relationship between gray level and spatial density of ink in the case where inks of two colors, deep and pale, are used.
Figure 5:
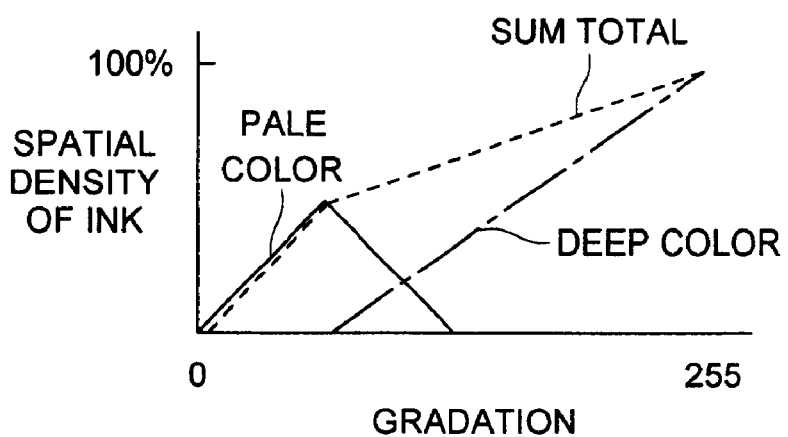

In FIG. 3, processing steps in the mask calculation circuit 102 are shown in detail. In the drawing, the mask calculation circuit generates recording mask data of appearance frequency proportional to the mask amount by error diffusion. To state it more concretely, first, for the inputted data of 8 bits for each of Y, M, C, and k, the data are converted into the ink amount data for each of the ink kinds in accordance with a deep/pale color allocation rule (102a). For example, in the case of Table 1, the ink amounts become such ones as shown in FIG. 5(a). After that, the total amount of ink is obtained from the ink amount of each color, and the ordinate of the graph is scaled from 0 to 400%.

Now, on the basis of the characteristic of the medium (ink absorption characteristic), the allowable ink amount is obtained by using a calculation equation or a table which has been determined beforehand. For example, in the case where the allowable ink amount is 160% by spatial density of ink, the values of spatial density of ink is changed in such a way as to be thinned out by multiplying it by 0.8 at the spatial density 200%, and by 0.4 at 400% (processing 102b). In addition, in the processing 102b shown in FIG. 3, an example in which the allowable ink amount is limited to 200% by spatial density of ink is shown; hence, because no adjustment is made before the ink amount exceeds 200%, the limiting curve S is constant up to 200%, and it gradually decreases from 200% to 400%, to limit the ink amount. By making the limiting curve S not a line with sharp bends but a smooth line, a high-quality image can be formed.

Figure 1:
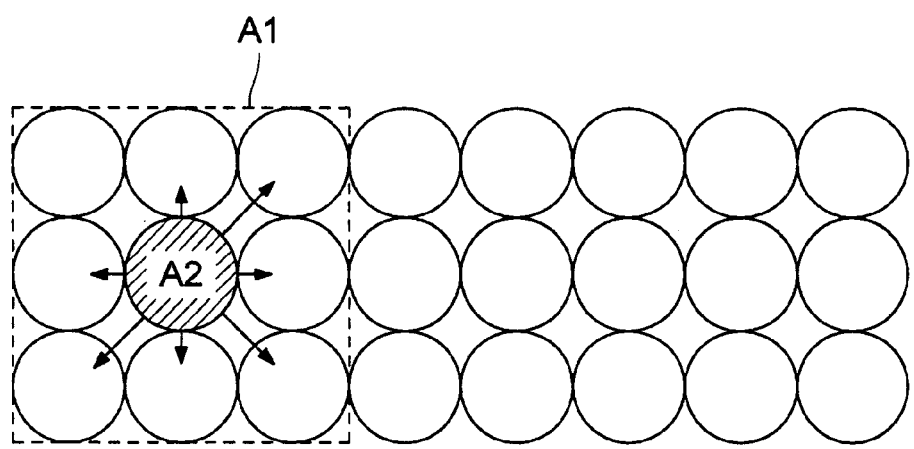
FIG. 1 is a drawing showing ink jetting domains on a medium schematically.

With the ink limiting amount obtained in this way made the mask amount, whose values are subjected to a binary error diffusion processing in the processing 102c, the recording frequency (recording mask data) is calculated. Besides, in the error diffusion processing, as shown in FIG. 3, noise addition, threshold shift, and quantization processing are performed, and data are fed back by an error filter; however, because these are all known to the public, detailed explanation will be omitted. When the recording mask data obtained in this way is inputted in the error diffusion circuit 103, if the corresponding pixel (the ink landing domain A1 in FIG. 1) is the object of masking, both the image data and the error diffusion output data are made forcibly to be zero. Only the sum of the transferred amounts of error from the neighboring pixels (the ink landing domains around A1 in FIG. 1) is stored in an error buffer. If the corresponding pixel is not the object of masking, a multi-valued error diffusion processing similar to a conventional one is carried out.

In the above-mentioned structure, the error diffusion circuit requires only 4 circuits for Y, M, C, and K and one circuit for mask calculation, that is, 5 circuits in total. In contrast with this, for example, in the case where an error diffusion processing is carried out separately for deep and pale color inks in a conventional way, the required number of processing circuits is 4 (colors)×2 (deep and pale)=8 for the deep and pale Y, M, C, and K colors, which makes the scale of the circuit in the conventional technology about 8/5 times that of this invention. By employing a structure of this example of the embodiment, it is unnecessary to provide a quantization processing circuit independently for a deep color and a pale color, which makes it possible to reduce the scale of the circuit.

In this example, the mask value is made common to all colors; however, it can be considered that, in accordance with the characteristic of human eyes, for example, the ink amount limitation value (102b) is made relatively gentle for higher-density colors (K and C and M) and it is made relatively severe for lower-density colors (Y). Further, also it can be considered that by changing phases of noises to be added for each of the colors (that is, changing the noise characteristics), or by changing the characteristics of the error filters (diffusion filters), the positions of masking are dispersed with the change of color. By changing the masks with color (group), it can be expected to make the fluctuation of luminance distribution smaller. Further, in the above-mentioned example, the mask amount (ink amount limit) is calculated through the steps of conversion into the ink amount of each color, addition, and reference to a table of ink amount limit; however, it can be considered a method in which, by using a multi-dimensional LUT for a series of processing steps for example, the ink amount limit value is calculated for each of combinations of image data.

This example of the embodiment is effective not only for a ternary case but also for a quaternary or an N-ary (N is greater than 4) case in the same way. Further, as compared to the case where data are processed separately for a deep and a pale color, the scale of the circuit can be made smaller.

Up to now, this invention has been explained with reference to the embodiment, but this invention should not be construed as limited to the above-mentioned example of the embodiment, and it is a matter of course that this invention can be suitably modified or improved. For example, it is also possible to provide a plurality of mask calculation circuits.

By this invention, it is possible to provide an image data processing method for an ink jet printer having a simple structure and being capable of suppressing ink overflow.

What is claimed is:

1. An image data processing method for ink jet printer comprising the steps of:
    obtaining an allowable amount of ink in accordance with inputted image data and characteristics of a medium for forming an image;
    selecting an ink jetting domain and fixing the amount of ink in the selected ink jetting domain at a specified value, on the basis of the allowable amount of ink; and
    practicing a quantization processing with the amount of ink in the ink jetting domain fixed at the specified value.

2. The image data processing method of claim 1, wherein the specified value for the amount of ink in the selected ink jetting domain is zero.

3. The image data processing method of claim 2, wherein the quantization processing is an error diffusion processing.

4. The image data processing method of claim 1, wherein the quantization processing is an error diffusion processing.

5. The image data processing method of claim 1, wherein the allowable amount of ink is determined in accordance with the kind of ink to be used for expressing the color corresponding to the inputted image data.

6. The image data processing method of claim 5, wherein the kind of ink color includes at least cyan, magenta, and yellow.

7. The image data processing method of claim 6, wherein at least one kind of ink color comprises a pale color and a deep color of the same hue.

8. The image data processing method of claim 1, wherein the processing to fix the amount of ink at the specified value is determined in accordance with the kind of ink color to be used for expressing the color corresponding to the inputted image data.

9. The image data processing method of claim 8, wherein the kind of ink color includes at least cyan, magenta, and yellow.

10. The image data processing method of claim 9, wherein at least one kind of ink color comprises a pale color and a deep color of the same hue.

11. The image data processing method of claim 8, wherein a characteristic of a noise in the quantization processing is changed in calculating the specified value in accordance with the color corresponding to the inputted image data.

12. The image data processing method of claim 11, wherein a characteristic of a diffusion filter in the quantization processing is changed in calculating the specified value in accordance with the color corresponding to the inputted image data.

13. The image data processing method of claim 8, wherein a characteristic of a diffusion filter in the quantization processing is changed in calculating the specified value in accordance with the color corresponding to the inputted image data.

14. The image data processing method of claim 1, wherein the characteristics of a medium include an ink absorption characteristic of the medium.

* * * * *